United States Patent
Jin et al.

(10) Patent No.: US 7,729,085 B2
(45) Date of Patent: Jun. 1, 2010

(54) THERMALLY ASSISTED RECORDING OF MAGNETIC MEDIA USING AN OPTICAL RESONANT CAVITY

(75) Inventors: Xuhui Jin, West Lafayette, IN (US); Chie Ching Poon, San Jose, CA (US); Timothy Carl Strand, San Jose, CA (US); Henry Hung Yang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1093 days.

(21) Appl. No.: 11/398,144

(22) Filed: Apr. 4, 2006

(65) Prior Publication Data

US 2007/0230047 A1  Oct. 4, 2007

(51) Int. Cl.
G11B 5/02 (2006.01)
G11B 5/127 (2006.01)
G11B 7/00 (2006.01)
G11B 11/00 (2006.01)

(52) U.S. Cl. ............... 360/125.31; 360/59; 360/125.3; 360/128; 369/13.13; 369/112.27

(58) Field of Classification Search ............... 360/59, 360/125.3, 125.31, 128; 369/13.02, 13.33, 369/13.13, 13.17, 112.27
See application file for complete search history.

(56) References Cited

U.S. PATENT DOCUMENTS

| 5,835,458 | A  | 11/1998 | Bischel et al. |
| 5,878,070 | A  | 3/1999  | Ho et al. |
| 6,714,370 | B2 | 3/2004  | McDaniel et al. |
| 6,768,556 | B1 | 7/2004  | Matsumoto et al. |
| 6,795,380 | B2 | 9/2004  | Akiyama et al. |

(Continued)

FOREIGN PATENT DOCUMENTS

JP   2001326420   11/2001

(Continued)

OTHER PUBLICATIONS

Mode Characteristics of a Multiridge Rectangular Waveguide by Zhongxian Shen et al., Microwave and Optical Technology Letters, vol. 26, No. 5, Sep. 5, 2000.

(Continued)

Primary Examiner—William J Klimowicz
(74) Attorney, Agent, or Firm—Zilka-Kotab, PC

(57) ABSTRACT

The media heating device of the magnetic head includes an optical resonant cavity produces a high intensity near-field optical beam of subwavelength dimension adjacent to the write pole. A suitable resonant cavity may be a spherical cavity, disk shaped cavity, ring shaped cavity, racetrack shaped cavity, micropillar cavity, photonic crystal cavity and Fabry-Perot cavity. The cavity is fabricated as a planar thin film structure in layers that are generally parallel to the magnetic pole thin film layers of the magnetic head, such that the principal axis of the resonant cavity is parallel to the air bearing surface (ABS). Optical energy is coupled into the resonant cavity through a waveguide that is placed proximate the cavity, and optical energy is coupled out of the cavity through an aperture that is placed within the cavity. A preferred embodiment may include a nano-aperture disposed between the resonant cavity and the ABS.

19 Claims, 5 Drawing Sheets

U.S. PATENT DOCUMENTS

| | | | |
|---|---|---|---|
| 7,272,079 B2* | 9/2007 | Challener | 369/13.17 |
| 7,310,205 B2* | 12/2007 | Hsu et al. | 360/317 |
| 7,330,404 B2* | 2/2008 | Peng et al. | 369/13.33 |
| 7,333,294 B1* | 2/2008 | Li et al. | 360/125.02 |
| 7,345,840 B2* | 3/2008 | Gomez et al. | 360/59 |
| 7,365,941 B2* | 4/2008 | Poon et al. | 360/125.01 |
| 7,483,229 B2* | 1/2009 | Rausch et al. | 360/59 |
| 2002/0080842 A1 | 6/2002 | An et al. | |
| 2003/0123335 A1 | 7/2003 | Rettner et al. | |
| 2003/0128452 A1* | 7/2003 | McDaniel et al. | 360/59 |
| 2003/0137772 A1 | 7/2003 | Challener | |
| 2003/0184903 A1 | 10/2003 | Challener | |
| 2003/0198146 A1 | 10/2003 | Rottmayer et al. | |
| 2004/0001420 A1 | 1/2004 | Challener | 369/112.27 |
| 2004/0008591 A1* | 1/2004 | Johns et al. | 369/13.14 |
| 2004/0062152 A1 | 4/2004 | Stancil et al. | |
| 2004/0062503 A1 | 4/2004 | Challener | |
| 2005/0289576 A1* | 12/2005 | Challener | 720/658 |
| 2006/0067001 A1* | 3/2006 | Hsu et al. | 360/234.3 |
| 2006/0119971 A1* | 6/2006 | Kurita et al. | 360/69 |
| 2006/0119983 A1* | 6/2006 | Rausch et al. | 360/128 |
| 2006/0164960 A1* | 7/2006 | Poon et al. | 369/124.01 |
| 2007/0230010 A1* | 10/2007 | Jin et al. | 360/69 |

FOREIGN PATENT DOCUMENTS

| | | |
|---|---|---|
| JP | 2001351277 | 12/2001 |
| JP | 2002133608 | 5/2002 |
| JP | 2003006803 | 1/2003 |
| JP | 2004061360 | 2/2004 |

OTHER PUBLICATIONS

Detection Signal-to-Noise Ratio Versus Bit Cell Aspect Ratio at High Areal Densities by Jinghuan Chen et al., IEEE Transactions on Magnetics, vol. 37, No. 3, May 2001.

Light Delivery Techniques for Heat-Assisted Magnetic Recording by William A. Challener et al., published Sep. 28, 2002.

Issues in Heat-Assisted Perpendicular Recording by Terry W. McDANIEL et al.; IEEE Transactions on Magnetics, vol. 39, No. 4, Jul. 2003.

Optical Microcavities by Kerry J. Vahala, Nature, vol. 424, Aug. 14, 2003.

Design of a C aperture to achieve A/10 resolution and resonant transmission by Xiaolei Shi et al., Optical Society of America, vol. 21, No. 7, Jul. 2004.

Ridge waveguide as a near field aperture for high density data storage by Kursat Sendur et al., Journal of Applied Physics, vol. 96, No. 5, Sep. 1, 2004.

R.W. Boyd, et al., "Nanofabrication of optical structures and devices for photonics and biophotonics", Journal of Modern Optics 2003, vol. 50, No. 15-17, 2543-2550.

* cited by examiner

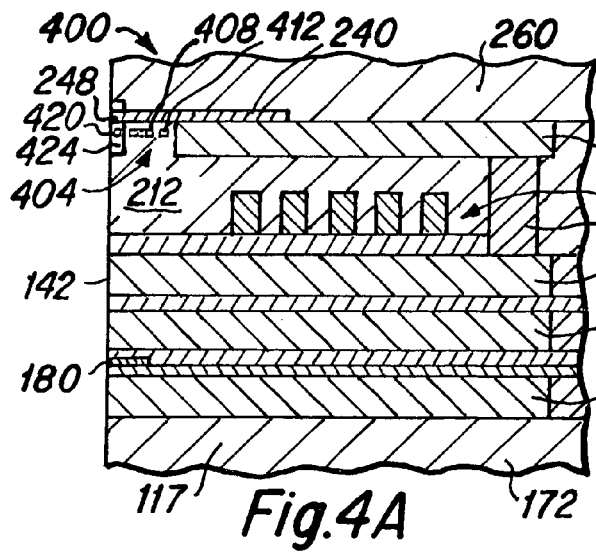
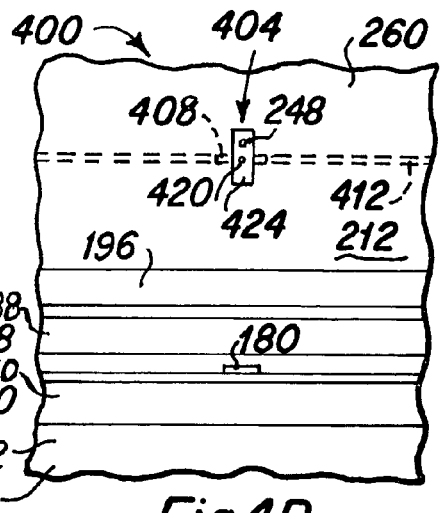
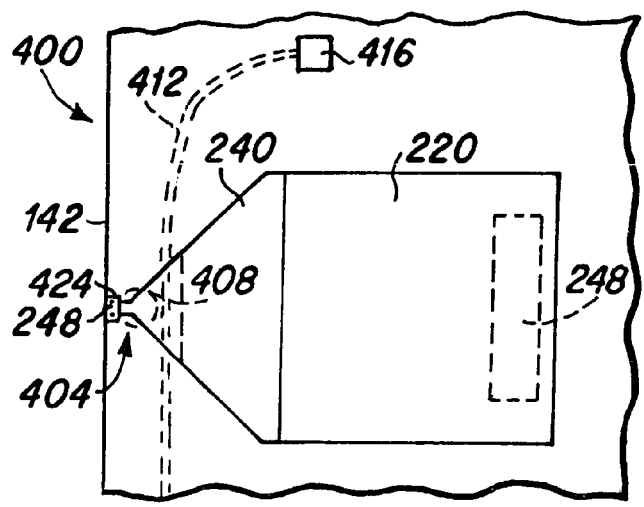
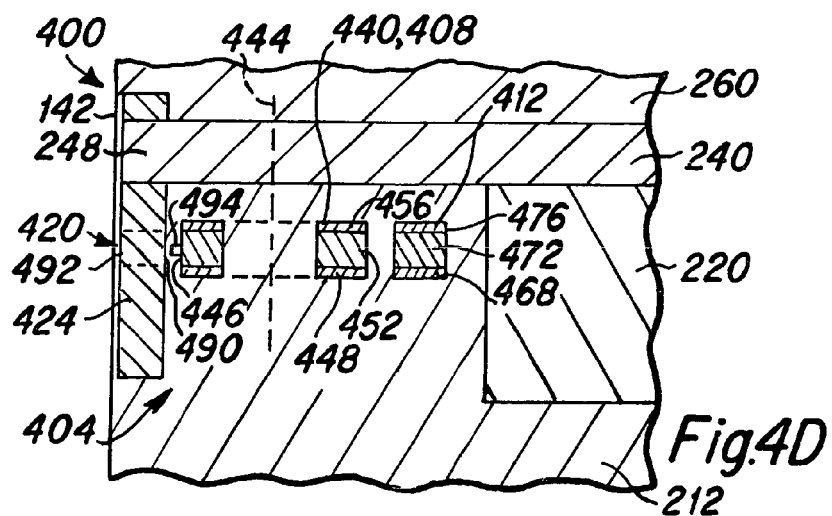

THERMALLY ASSISTED RECORDING OF MAGNETIC MEDIA USING AN OPTICAL RESONANT CAVITY

BACKGROUND OF THE INVENTION

1. Field of the Invention

The present invention relates generally to magnetic heads that are utilized with thin film hard disk data storage devices, and more particularly to the design and fabrication of a magnetic head having an optical energy resonant cavity storage media heating device.

2. Description of the Prior Art

Hard disk drives generally include one or more rotatable data storage disks having a magnetic data storage layer formed thereon. Data in the form of small magnetized areas, termed magnetic data bits, are written onto the magnetic layers of the disks by a magnetic head that includes magnetic poles through which magnetic flux is caused to flow. Magnetic flux flowing from a pole tip portion of the magnetic poles in close proximity to the magnetic layer on the disk, causes the formation of the magnetic bits within the magnetic layer.

The continual quest for higher data recording densities of the magnetic media demands smaller magnetic data bit cells, in which the volume of recording material (grains) in the cells is decreased and/or the coercivity (Hc) is increased. When the bit cell size is sufficiently reduced, the problem of the superparamagnetic limit will provide a physical limit of the magnetic recording areal density. Present methods to delay the onset of this limit in storage media include the use of higher magnetic moment materials, and using thermally assisted recording (TAR) heads. The present invention relates to such thermally assisted recording heads in which a heating device is disposed within the magnetic head. Heat from the heating device temporarily reduces the localized coercivity of the magnetic media, such that the magnetic head is able to record data bits within the media. Once the disk returns to ambient temperature, the very high coercivity of the magnetic media provides the bit stability necessary for the recorded data disk.

In using optical energy for the heating of the magnetic medium, one needs to consider the applicability of the optics in near field, e.g., 1 to 20 nm from the source which resides in the magnetic head slider, and the heating of an area in the medium of very small dimensions, e.g., in the 20 to 30 nm range. Conventional diffraction limited optics is not applicable for such a small area. Recently, descriptions of several TAR methods for near-field heating of media have been published. In published U.S. patent applications US2003/0184903 A1 and US2004/0008591 A1 special ridged waveguides are used as high transmission apertures disposed within the magnetic head are taught for applications in perpendicular recording. In general the size of the heated spot depends on the optical wavelength and the dimensions and the composition of the materials for the waveguide/ridged waveguide. For instance, the transmittance of sub-wavelength circular apertures decreases as $r^4$ where r is the radius of the waveguide aperture. Thus the transmittance efficiency of sub-wavelength apertures is very poor and high power lasers would be required to heat the medium.

The present invention utilizes an optical resonant cavity to amplify the light intensity and thus increase overall efficiency of transmitting light from the laser source to the medium. Such resonant cavities include spherical cavities, disk shaped cavities, ring shaped cavities, racetrack shaped cavities, micropillar cavities, photonic crystal cavities and Fabry-Perot cavities. Such cavities are known to those skilled in the art and are described in articles such as "Optical Microcavities" by Kerry J. Vahala, Nature, vol. 34, 14 Aug. 2003, page 839-846. The coupling of power into the optical resonant cavity may be by way of evanescent-wave coupling from an optical fiber or integrated waveguide. As a prior art example of this, R. W. Boyd et al., in Journal of Modern Optics, 2003, Vol. 50, No.15-17, 2543-2550, "Nanofabrication of optical structures and devices for photonics and biophotonics" teaches a system consisting of a waveguide coupled to a resonant whispering gallery mode (WGM) cavity. In this technique a tapered planar waveguide is placed within a gap that is a fraction of a wavelength from a resonant microcavity.

Much of the difficulty in applying near field optical devices for TAR lies in their incompatibility with the space-limited mechanical structure of the write poles within a magnetic head, the difficulty in bringing photons to such devices, and meeting the requirements for producing a near field high intensity optical beam that is within about 10 nm from the bit area that is being written. The heated spot is preferably at or a short distance uptrack of the write pole. Furthermore, many structures suggested for TAR heads are not readily compatible with current manufacturing processes, which rely on building planar structures perpendicular to the ABS with thin film deposition and etching techniques. The present invention facilitates the fabrication of the resonant cavity within the magnetic head structure at the wafer level of magnetic head fabrication.

SUMMARY OF THE INVENTION

An embodiment of a magnetic head of the present invention includes a media heating device that is fabricated within the magnetic head structure. The media heating device is preferably fabricated between the first and second magnetic pole layers of a perpendicular magnetic head and close to the ABS surface of the head, where it serves to heat the magnetic media during or immediately prior to the passage of the magnetic media beneath the write gap of the magnetic head. The heating of the media lowers its localized coercivity, which facilitates the writing of data to the media by the write head element of the magnetic head.

The media heating device of the magnetic head of the present invention includes an optical resonant cavity that can produce a high intensity near-field optical beam of subwavelength dimension adjacent to the write pole that is appropriate for perpendicular recording at 1 Tbits/in$^2$ and beyond. A suitable resonant cavity may be any of the known prior art cavities, such as spherical cavities, disk shaped cavities, ring shaped cavities, racetrack shaped cavities, micropillar cavities, photonic crystal cavities and Fabry-Perot cavities, as are known to those skilled in the art. A preferred embodiment includes a resonant cavity that is fabricated in a plane that is parallel to the planar magnetic poles of the magnetic head and where the principal axis of the cavity is parallel to the ABS. Optical energy is coupled into the resonant cavity through a waveguide that is placed proximate the cavity, and optical energy may be coupled out of the cavity through an aperture that is placed proximate the cavity. A preferred aperture embodiment includes a nano-aperture disposed between the resonant cavity and the ABS.

It is an advantage of the magnetic head of the present invention that it includes an improved media heating element to facilitate the writing of data to a magnetic disk.

It is another advantage of the magnetic head of the present invention that it includes an improved heating element that is disposed such that the media is heated by the heating element prior to its passage below the write pole of the magnetic head.

It is a further advantage of the magnetic head of the present invention that it provides high efficiency coupling of light from a source into the media by means of an optical resonant cavity.

It is yet another advantage of the magnetic head of the present invention that the coupling of light from a source into the near-field storage medium is by way of a strip waveguide or optical fiber and a resonant cavity such as a whispering gallery mode (WGM) disk or ring.

It is still another advantage of the magnetic head of the present invention that it is composed of thin film structures which can be readily fabricated at the wafer level utilizing thin film processing technologies.

It is still a further advantage of the magnetic head of the present invention that it provides a heated spot that is scalable as bit density increases beyond 1 Tbits/in$^2$.

It is an advantage of the hard disk drive of the present invention that it includes a magnetic head having an improved media heating element, whereby higher data areal storage densities of the hard disk drive can be obtained.

It is another advantage of the hard disk drive of the present invention that it includes a magnetic head having an improved media heating element, whereby data storage disks having a higher coercivity can be written upon.

It is a further advantage of the hard disk drive of the present invention that it includes a magnetic head that includes an improved media heating element to facilitate the writing of data to a magnetic disk.

It is yet another advantage of the hard disk drive of the present invention that it includes a magnetic head having an improved heating element that is disposed such that the media is heated by the heating element prior to its passage beneath the write pole of the magnetic head.

It is yet a further advantage of the hard disk drive of the present invention that it includes a magnetic head of the present invention in which the coupling of light from a source into the near-field storage medium is by way of a strip waveguide or optical fiber and a resonant cavity such as a whispering gallery mode (WGM) disk or ring.

It is still another advantage of the hard disk drive of the present invention that it includes a magnetic head having a heating element that provides high efficiency coupling of light from a source into the media by means of an optical resonant cavity.

It is yet another advantage of the hard disk drive of the present invention that it includes a magnetic head of the present invention that is composed of thin film structures which can be readily fabricated at the wafer level utilizing thin film processing technologies.

It is yet a further advantage of the hard disk drive of the present invention that it includes a magnetic head having a heating element that provides a heated spot that is scalable as bit density increases beyond 1 Tbits/in$^2$.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

Figure 3A:
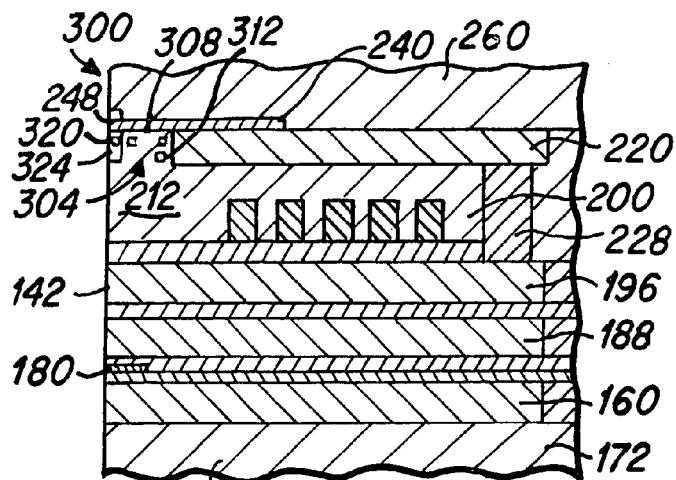
Figure 3B:
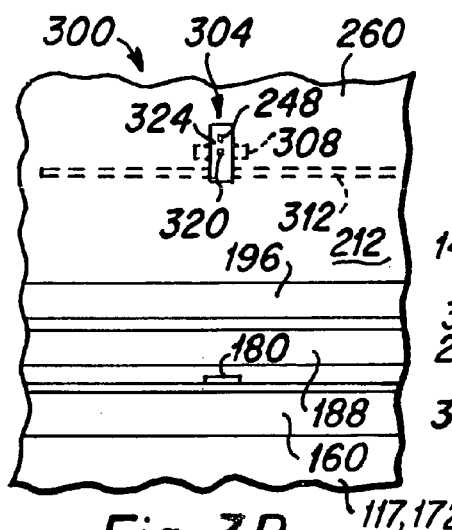
Figure 3C:
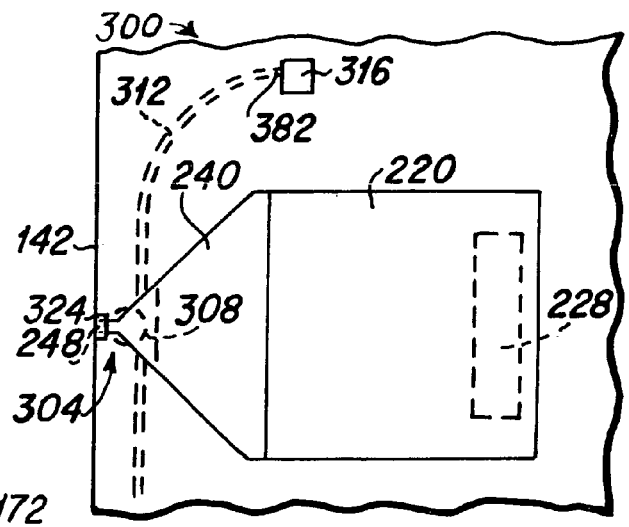
Figure 3D:
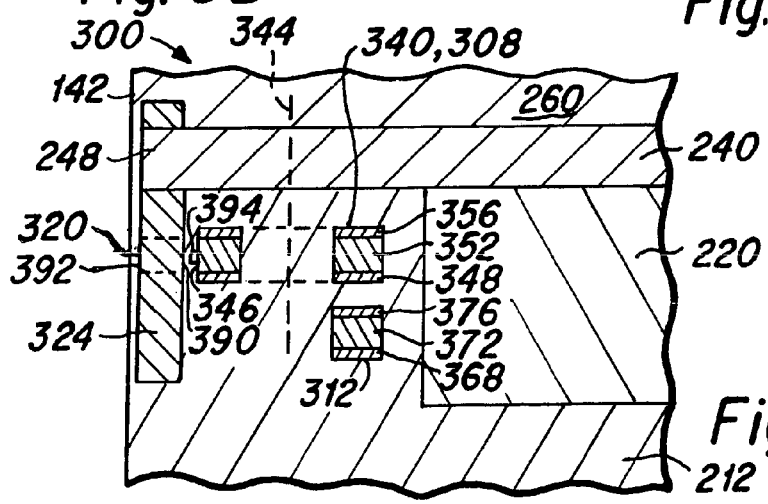
Figure 3E:
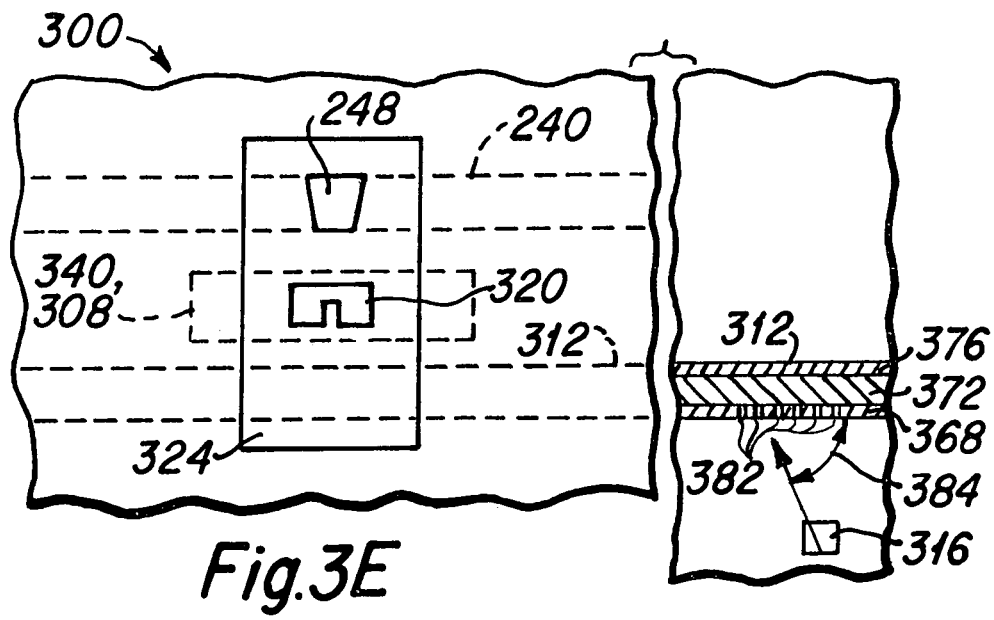
Figure 3F:
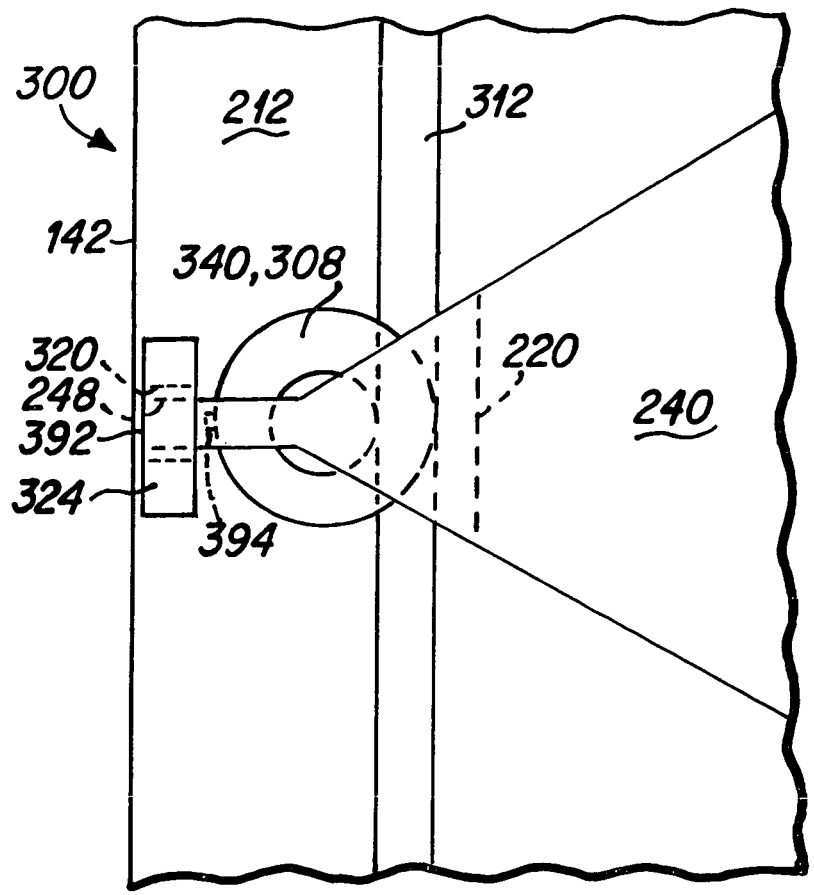
Figure 4E:
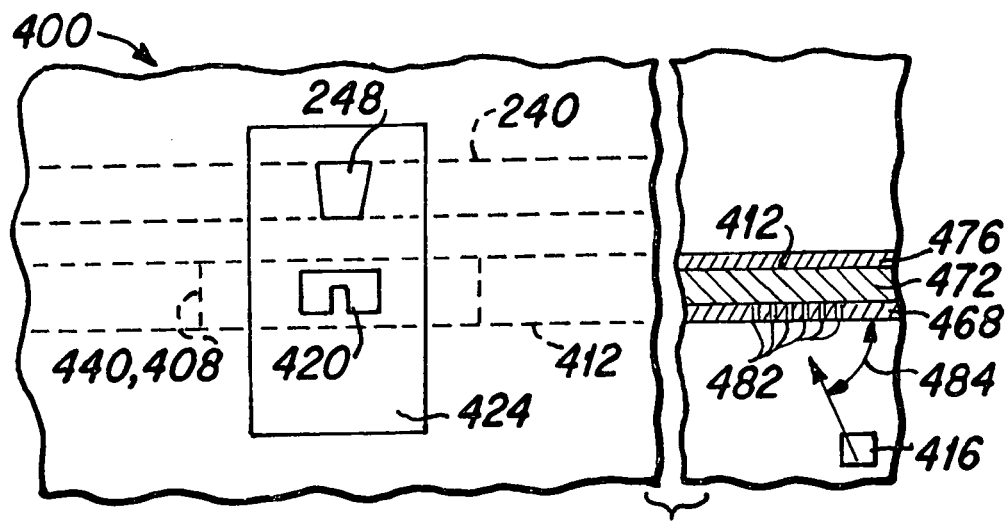
Figure 4F:
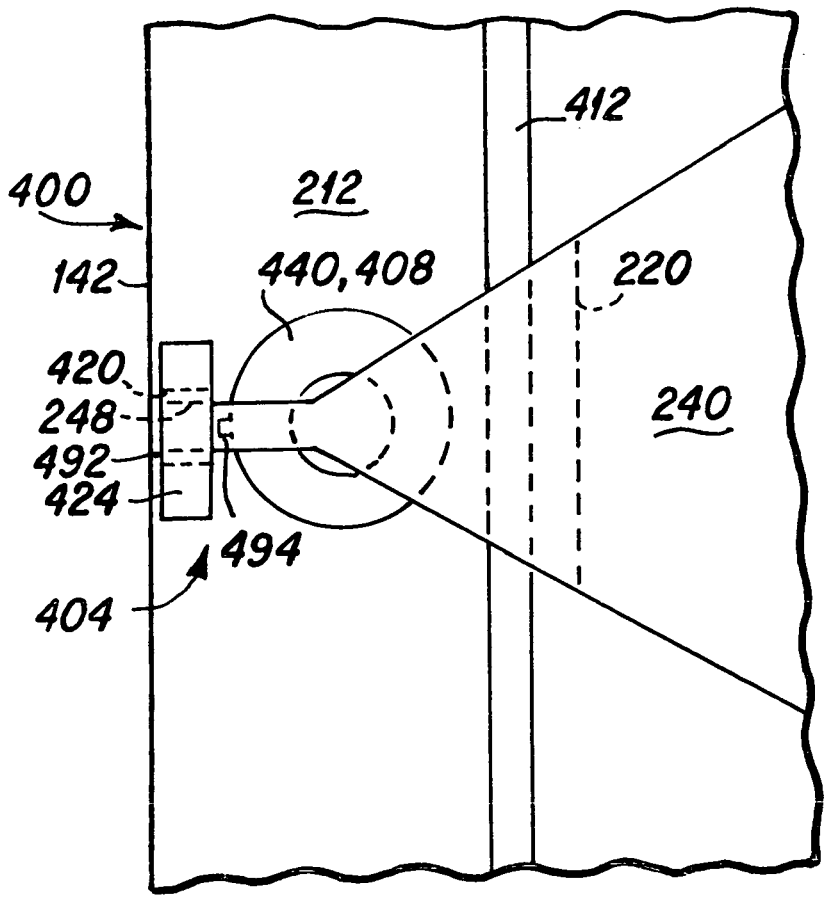

FIGS. 3A, 3B, 3C, 3D, 3E and 3F depict a first embodiment of a magnetic head of the present invention that includes an optical resonant cavity media heating device, wherein FIG. 3A is a side cross-sectional view, FIG. 3B is a plan view taken from the ABS, FIG. 3C is a plan view taken from the down-track side, FIG. 3D is an enlarged side cross-sectional view of the magnetic pole portion of the magnetic head depicted in FIG. 3A, FIG. 3E is an enlarged plan view of the pole portion of the magnetic head depicted in FIG. 3B, and FIG. 3F is an enlarged plan view of the pole tip portion of the magnetic head depicted in FIG. 3C; and FIGS. 4A, 4B, 4C, 4D, 4E and 4F depict a second embodiment of a magnetic head of the present invention that includes an optical resonant cavity media heating device, wherein FIG. 4A is a side cross-sectional view, FIG. 4B is a plan view taken from the ABS, FIG. 4C is a plan view taken from the down-track side, FIG. 4D is an enlarged side cross-sectional view of the magnetic pole portion of the magnetic head depicted in FIG. 4A, FIG. 4E is an enlarged plan view of the pole portion of the magnetic head depicted in FIG. 4B, and FIG. 4F is an enlarged plan view of the pole tip portion of the magnetic head depicted in FIG. 4C.

DETAILED DESCRIPTION OF THE PREFERRED EMBODIMENTS

Figure 1:
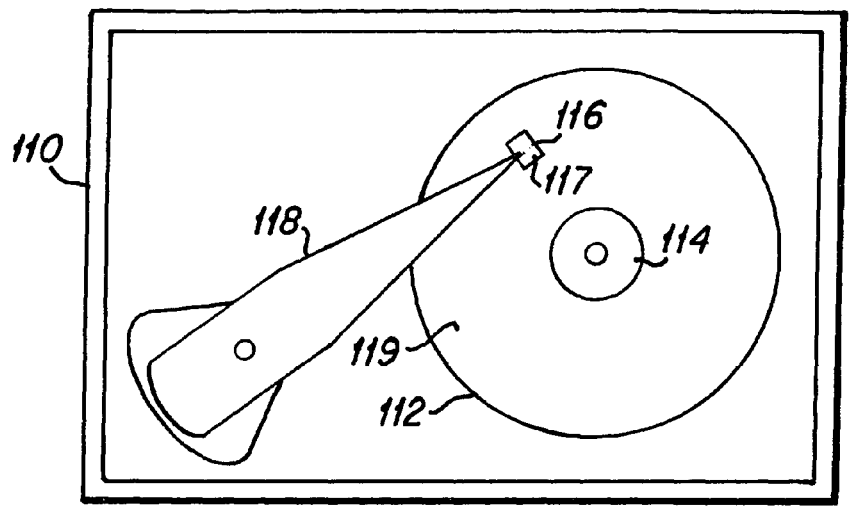
FIG. 1 is a schematic top plan view of a hard disk drive including a magnetic head of the present invention.

The magnetic head of the present invention is utilized to read and write data to magnetic media, such as a hard disk in a hard disk drive. A simplified top plan view of a hard disk drive 110 is presented in FIG. 1, wherein at least one magnetic media hard disk 112 is rotatably mounted upon a spindle 114. A magnetic head 116 of the present invention is formed upon a slider 117 that is mounted upon an actuator arm 118 to fly above the surface 119 of each rotating hard disk 112, as is well known to those skilled in the art. A typical hard disk drive 110 may include a plurality of disks 112 that are rotatably mounted upon the spindle 114, and a plurality of actuator arms 118, each having at least one slider 117 including a magnetic head 116 that is mounted upon the distal end of the actuator arms 118. As is well known to those skilled in the art, when the hard disk drive 110 is operated, the hard disk 112 rotates upon the spindle 114 and the slider acts as an air bearing in flying above the surface of the rotating disk. The slider 117 includes a substrate base upon which various layers and structures that form the magnetic head are fabricated. Such heads are fabricated in large quantities upon a wafer substrate and subsequently sliced into discrete magnetic heads 116.

Figure 2:
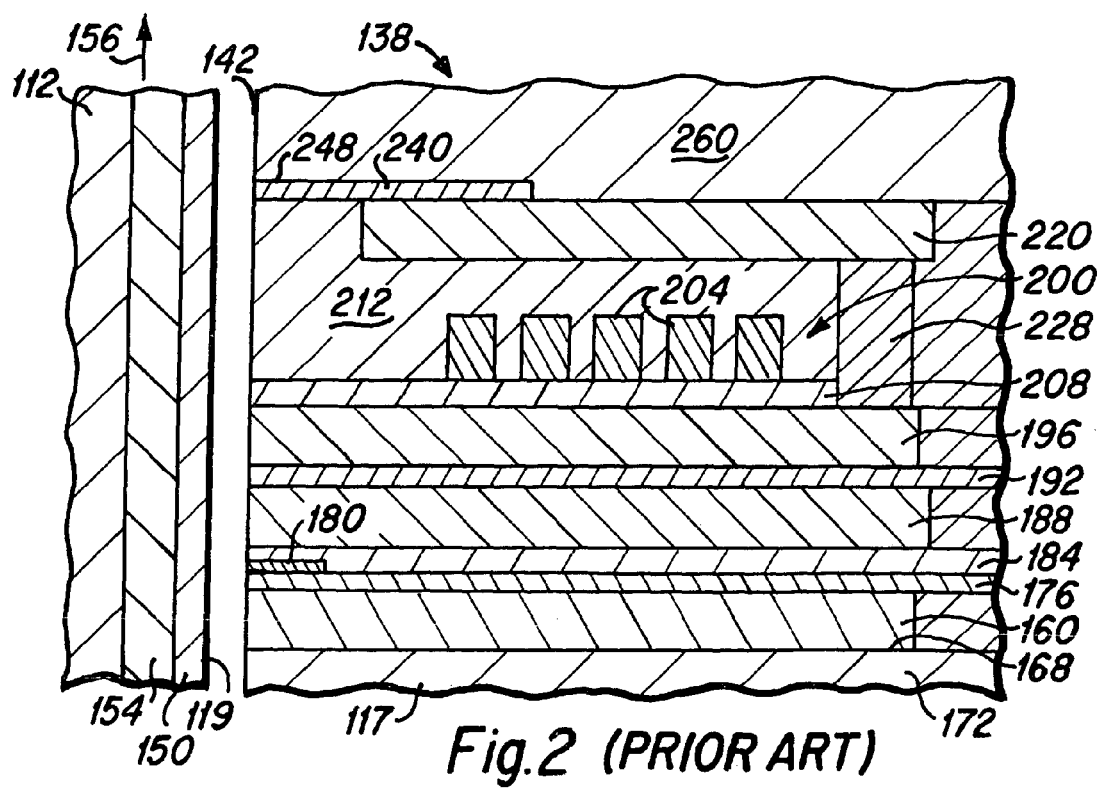
FIG. 2 is a side cross-sectional view depicting various components of a prior art perpendicular magnetic head.

FIG. 2 is a side cross-sectional diagram of a typical prior art perpendicular magnetic head 138 which serves as a basis for the description of an improved perpendicular write head of the present invention which follows. As depicted in FIG. 2, a slider 117 having an air bearing surface (ABS) 142 is shown in a data writing position above the surface 119 of a hard disk 112. The disk 112 typically includes a high coercivity magnetic layer 150 that is fabricated on top of a magnetically soft underlayer 154. In FIG. 2, the disk 112 is moving towards the top (arrow 156) relative to the stationary slider 117.

The perpendicular head 138 includes a first magnetic shield layer (S1) 160 that is formed upon the upper surface 168 of the slider substrate 172. A first insulation layer (G1) 176 is formed on the S1 shield 160 and a read head sensor element 180 is formed on the G1 layer 176. A second insulation layer (G2) 184 is formed on the sensor 180 and a second magnetic shield layer (S2) 188 is formed upon the G2 insulation layer 184. An electrical insulation layer 192 is then deposited upon the S2 shield 188, and a first magnetic pole (P1) 196 is fabricated upon the insulation layer 192. An induction coil structure 200 is fabricated upon the P1 pole 196, that includes induction coil turns 204 that are typically formed upon an electrical insulation layer 208 and within filling insulation 212. A second magnetic pole layer 220, typically termed a shaping layer, is fabricated on top of the induction coil structure 200. A magnetic back gap piece 228 joins the back portions of the P1 pole 196 and the shaping layer 220, such that magnetic flux can flow between them. A write pole probe layer 240 including a write pole tip 248 is next fabricated in magnetic flux communication with the shaping layer 220. As is well known to those skilled in the art, the various layers that comprise the magnetic pole are fabricated utilizing thin film deposition and shaping techniques.

Following the fabrication of the probe layer 240, further magnetic head fabrication steps, such as the fabrication of electrical interconnects (not shown), are accomplished, as are well known to those skilled in the art, and the magnetic head is subsequently encapsulated, such as with the deposition of an alumina layer 260. Thereafter, the wafer is sliced into rows of magnetic heads, and the ABS surface 142 of the heads is carefully polished and lapped and the discrete magnetic heads 138 are ultimately formed.

As is well understood by those skilled in the art, electrical current flowing through the induction coil 204 will cause magnetic flux to flow through the magnetic poles of the head, where the direction of magnetic flux flow depends upon the direction of the electrical current through the induction coil. For instance, current in one direction will cause magnetic flux to flow through the shaping layer 220 through the narrow pole tip 248 into the high coercivity magnetic layer 150 of the hard disk 112. This magnetic flux causes magnetized data bits to be recorded in the high coercivity layer 150 as the disk moves past the magnetic head in direction 156, where the magnetization of the data bits is perpendicular to the surface 119 of the disk 112.

As indicated hereabove, to increase the areal data storage density of hard disk drives, the disks are fabricated with high coercivity magnetic media that can form and maintain smaller magnetic data bit cells. To write data to the high coercivity media it is helpful to include a media heating device within the magnetic head, such that the localized heating of the media reduces its coercivity and the magnetic head can then more easily and reliably write data bits into the heated magnetic media layer. Once the disk returns to ambient temperature the high coercivity of the magnetic media provides the bit stability necessary for the recorded data bit. As is described hereinbelow, the present invention includes magnetic heads having improved media heating devices that comprise optical resonant cavity systems for enabling thermally assisted recording for 1 Tbits/in$^2$ and beyond. A general discussion of such optical systems is next presented, followed by a detailed discussion of their implementation in the magnetic head embodiments of the present invention.

The resonant cavity optical system for a magnetic head of the present invention consists of three separate elements which have to be designed to work together. The main component is a resonant cavity that provides high optical fields to improve coupling efficiencies. A means for bringing light from a laser source into the resonant cavity is also required; this is preferably a waveguide having a tapered portion that is located close to the cavity in a manner to maximize coupling from the waveguide to the cavity. Other light conveying means can include an optical fiber and the direct focusing of a laser source onto the resonant cavity. Finally, a means of coupling light from the cavity to the medium in a small, localized area on the order of 20-30 nm in diameter is utilized.

In this regard, the present invention may include a nano-aperture that produces a hot spot in the near field of the nano-aperture. This small hot spot locally heats the recording medium, allowing the magnetic head to record a data bit. This resonant cavity structure is designed so that it can be fabricated in thin film layers at the wafer level along with the rest of the head structure. This dramatically reduces the cost of the head as compared to building these devices at the individual head level which involves fabrication steps undertaken at the air bearing surface of the head.

In the present invention the optical resonant cavity may be any of the known prior art cavities, such as spherical cavities, disk shaped cavities, ring shaped cavities, racetrack shaped cavities, micropillar cavities, photonic crystal cavities and Fabry-Perot cavities, as are known to those skilled in the art. The racetrack-shaped ring structure nominally includes two semicircular end segments with straight segments disposed between them. The field inside these cavities can be enhanced over the field used to feed the cavity by a large factor equal to the Q, or quality factors of the cavity. Q values of >1 are commonly quoted and values $10^5$-$10^9$ have been demonstrated in simulations. The large field enhancement in the cavity means larger fields can be delivered to the medium. The cavity is created as a dielectric material that is shaped to the desired cavity dimensions and disposed within the magnetic head, where the dielectric material is non-absorbing at the optical wavelengths used to excite the cavity. For a wavelength in the 1-2 μm range, silicon (Si) can be used as the cavity material. Cavities and waveguides can be integrated on a silicon-on-insulator (SOI) wafer, while other commonly used materials are silica-on-silicon and silicon oxy-nitride (SiON). Gallium arsenide and other Group III-V materials are also often used when sources (e.g. semiconductor lasers) or other active optical devices are integrated in the same structure, and they may also be incorporated within the present invention.

Light can be confined in the cavity by a number of well-known methods that all produce an interface that reflects the light. The simplest of these methods is an interface with a dielectric material of lower index of refraction as is used in step index optical fibers. Other methods include a reflective metal coating, a reflective dielectric thin film stack, a gradient index interface, an overlay of high index material, an overlay of a reflective grating, an anti-resonant reflective structure or a photonic crystal structure. For the purposes of this invention, dielectric interfaces will generally be the preferred method although metal interfaces may be used on the top and/or bottom faces to help confine the field that is coupled out of the cavity into the recording medium.

The dimensions of the cavity are determined by many parameters including the wavelength of the light in the material, the confinement method and the cavity mode being used. For example for a ring cavity resonator comprised of a material with a refractive index of n=2.2 in a matrix of material with refractive index n=1.46, with a thickness of 1 μm, a width of 0.75 μm and a ring radius of 2 μm, at a wavelength around 1.5 μm, there will resonances with the order of 40 maxima and minima in the cavity. The characteristics of the various cavities that may be used in the present invention are known to those skilled in the art, as exemplified by the Vahala reference identified above. For this invention, higher order modes are preferably employed to concentrate optical energy towards the periphery of the cavity, and whispering gallery modes (WGM), where there are a string of maxima around the periphery of the cylinder, may be used. In this case the cavity can be several microns in diameter. As is discussed in detail herebelow, the cavity is built into the magnetic head at the wafer level using thin film fabrication techniques with the cavity principal axis parallel to the air-bearing surface (ABS) and with a side edge of the cavity close to the ABS; the cavity is generally built as close to the write pole as possible on the up-track side of the pole.

Given a resonant cavity, mechanisms are required to bring light into the cavity and then again to couple light out of the cavity and into the recording medium. In practice, these elements all need to be designed in conjunction with the cavity and the recording medium to optimize the overall performance, but they are next discussed separately for simplicity. In general, a semiconductor laser will be used as the light source, and this invention uses a waveguide to bring light from the source to the resonant cavity. Although not necessary, for simplicity the waveguide will in general be similar to the cavity in terms of the materials and film thicknesses used to fabricate it. Light from the laser can be coupled into the waveguide in a number of commonly known ways. If the laser and waveguide are on the same substrate, the laser can be directly butt-coupled into the waveguide with good efficiency. If not, a spot size reducer can be put on the end of the waveguide and the laser can be focused onto it, or a grating or prism coupler can be placed on the waveguide for coupling. When properly designed, all of these methods can have good coupling efficiency.

To couple light from the waveguide to the cavity, the waveguide is generally tapered down and brought into close proximity to the cavity. An example of a waveguide coupled to a resonant cavity with both on the same substrate is presented in R. W. Boyd et al., in Journal of Modern Optics, 2003, Vol. 50, No. 15-17, 2543-2550, "Nanofabrication of optical structures and devices for photonics and biophotonics". When properly designed, this coupling can be close to 100% efficient and the field intensity in the cavity will be larger than the field in the waveguide by a factor of Q.

Finally it is required to couple the light out of the cavity and into the recording medium. Since the cavity has very high fields internally, any non-resonant aperture or perturbation placed on the cavity will result in good field strength outside the cavity. As an example of this, the article by Boyd et al. teaches placing a small absorbing particle on top of the cavity at the location of a field maximum, whereupon nearly 100% of the light from the waveguide is coupled through the cavity and out at the particle location, resulting in very strong fields at the particle. In the present invention, output coupling at a small localized area can be achieved by making a small diameter opening in the cavity and filling it with a material whose index of refraction is different from that of the cavity material. The light from the cavity opening is then preferably though not necessarily coupled into a nano-aperture that produces intense optical fields confined to spot sizes on the order of 1/30 of the wavelength or less. It is important to realize that this is one area where the design of the output coupling mechanism is tightly bound to the design of the cavity and to the recording medium. Introducing a perturbation will alter the cavity resonance slightly as will the presence of a nano-aperture and the recording medium located in the near field of the cavity. These effects have to be taken into consideration in the design of the cavity.

Two embodiments to illustrate the application of resonant cavities for thermally assisted magnetic recording are next discussed, where each of the embodiments of the present invention may serve as the magnetic head 116 within the hard disk drive 110 of the present invention.

FIGS. 3A-3F depict a first embodiment 300 of a magnetic head of the present invention that includes an optical resonant cavity media heating device 304, wherein FIG. 3A is a side cross-sectional view, FIG. 3B is a plan view taken from the ABS, FIG. 3C is a plan view taken from the downtrack side, FIG. 3D is an enlarged side cross-sectional view of the magnetic pole portion of the magnetic head depicted in FIG. 3A, FIG. 3E is an enlarged plan view of the pole portion of the magnetic head depicted in FIG. 3B, and FIG. 3F is an enlarged plan view of the pole tip portion of the magnetic head depicted in FIG. 3C.

As is best seen in FIGS. 3A, 3B and 3C, the magnetic head embodiment 300 includes a first magnetic shield layer 160, a read head sensor element 180 and a second magnetic shield layer 188, as well as the induction coil structure 200 including filling insulation 212, the shaping layer 220 and probe layer 240 that are similar to the structures depicted in FIG. 2 and described above, whereby they are correspondingly numbered for ease of comprehension.

The optical resonant cavity media heating device 304 of the present invention is preferably fabricated on the uptrack side of the probe layer 240 between the shaping layer 220 and the ABS 142; it includes an optical resonant cavity 308 and a waveguide 312 for coupling optical energy from a laser source 316 to the cavity 308, and may also include a nano-aperture 320 formed in a metal film 324 that is disposed at the ABS. As is best seen in the enlarged views of FIGS. 3D, 3E and 3F, the resonant cavity 308 is preferably though not necessarily fabricated as a disk, ring or racetrack shaped cavity 340 that is comprised of one or more thin film structures that are formed in planar thin film layers that are generally parallel to the planes in which the magnetic pole 196 and other thin film magnetic head structures are fabricated, such that the cavity 340 has a principal axis 344 that is parallel to the ABS and a side edge 346 of the cavity is disposed close to the ABS. In a preferred embodiment, the cavity 340 is fabricated with a bottom thin film cladding layer 348 of relatively low index of refraction material, such as $SiO_2$, a central ring core 352 that is fabricated as a thin film structure of a relatively high index of refraction material such as silicon, and a top thin film cladding layer 356 that is fabricated of a relatively low index of refraction material such as $SiO_2$ or a nonferrous metal such as gold, silver, aluminum and others. As described hereabove, the cavity 340 is sized to function as an optical resonant cavity in a higher order mode that concentrates optical energy at the periphery of the cavity, or a WGM mode for the wavelength of light that is coupled into it. A suitable resonant cavity may be any of the known prior art cavities, such as spherical cavities, disk shaped cavities, ring shaped cavities, racetrack shaped cavities, micropillar cavities, photonic crystal cavities and Fabry-Perot cavities, as are known to those skilled in the art.

The waveguide 312 is fabricated in close proximity to the cavity 340 and is spaced appropriately to couple light energy into the cavity. In the embodiment 300, the waveguide 312 is fabricated immediately uptrack from the cavity 340 and directed generally parallel to the ABS. In fabricating the magnetic head 300, the waveguide 312 is fabricated as a thin film structure in one or more magnetic head planes that are created prior to and parallel to the thin film planes in which the cavity 340 is fabricated. As with the cavity 340, the waveguide 312 is preferably fabricated with a bottom thin film cladding layer 368 comprised of a relatively low index of refraction material such as $SiO_2$, a central core 372 that is fabricated as a thin film structure and comprised of a relatively high index of refraction material such as silicon, and a top thin film cladding layer 376 that is comprised of a relatively low index of refraction material such as $SiO_2$. The choice of the actual materials used for the cladding layers 348, 356, 368 and 376 and the cores 352 and 372 are also influenced by factors including the wavelength of the source 316, the disk drive media and other magnetic head and disk drive parameters, as will be understood by those skilled in the art.

Coupling the light source 316 such as a solid state diode laser to the waveguide 312 can be accomplished by one of several methods, where the source 316 generally is an integrated component of the magnetic slider 117. One coupling method is best seen in FIG. 3E, in which a grating coupler consisting of grating lines 382 is formed on a cladding surface 368 or 376 (not shown) of the waveguide 312. The source 316 is appropriately focused and set at an angle of incidence 384 for best coupling. Alternatively, the light source 316 can be directly coupled into the end of the waveguide 312 away from the cavity. As is depicted in FIG. 3C, the waveguide 312 can be curved away from the ABS, such that the location of the grating coupler 382 can be several hundred microns or more from the write pole, thus avoiding the crowding of components proximate the write pole tip 248. Other methods of coupling the light source to the cavity can include the use of an optical fiber and the direct focusing of a laser source upon the cavity.

As is best seen in FIGS. 3D and 3E, where a nano-aperture is included with the resonant cavity 340 a metal film 324, which may be generally rectangular in shape, is fabricated between the outer side edge 346 of the cavity 340 and the ABS 142, and a nano-aperture 320 is fabricated through the thin metal film 324 directly opposite the side edge 346 of the cavity 340. The metal film 324 is preferably comprised of a nonferrous metal material such as silver, gold, aluminum, rhodium, platinum, chromium and others, the film 324 having a typical thickness of several tens of nanometers and thus being a fraction of a wavelength thick. The spacing of the side edge 346 of the cavity is preferably a few tens of nanometers from the inner face 390 of the nano-aperture 320, and the outer face 392 of the nano-aperture should be at or a few nanometers from the air bearing surface 142. The nano-aperture 320 thus acts to couple light energy from the resonant cavity 340 outward from the ABS to create a heated spot on the magnetic media that is located immediately uptrack from the location of the magnetic pole tip 248 above the media. In FIG. 3E the nano-aperture 320 is depicted as a C-shaped opening. The nano-aperture 320 can have a shape resembling the letter C or H or other shapes, such as square, rectangular, circular and oval, as are known in the art.

The output energy of the cavity 340, thus extends into the nano-aperture 320 to produce enhanced transmission of energy to create thennal heating at the magnetic medium. Enhanced coupling of energy from the side edge 346 of the cavity 340 to the nano-aperture 320 may be achieved by placing a small low index of refraction opening or pertubation 394 at the cavity side edge 346 location immediately closest to the nano-aperture 320. The size of the pertubation 394 is selected to optimize the coupling of energy to the size of the nano-aperture 320. Since the size of the pertubation 394 can affect the resonant behavior of the cavity 340, the cavity design can be adjusted for best performance of the coupled cavity-nano-aperture operation as will be understood by those skilled in the art.

The fill material 212 deposited proximate the waveguide and cavity and nano-aperture should preferably be of optical quality, and have an index of refraction that is lower than that of the materials from which these components are fabricated. Following the fabrication of the waveguide and resonant cavity and structures related thereto, further magnetic head components including the write pole layer 240 and associated structures are fabricated. Thereafter, the head is encapsulated, all as described hereabove and known to those skilled in the art.

FIGS. 4A-4F depict a second embodiment of a magnetic head of the present invention that includes an optical resonant cavity media heating device, wherein FIG. 4A is a side cross-sectional view, FIG. 4B is a plan view taken from the ABS, FIG. 4C is a plan view taken from the downtrack side, FIG. 4D is an enlarged side cross-sectional view of the magnetic pole portion of the magnetic head depicted in FIG. 4A, FIG. 4E is an enlarged plan view of the pole portion of the magnetic head depicted in FIG. 4B, and FIG. 4F is an enlarged plan view of the pole tip portion of the magnetic head depicted in FIG. 4C.

As is best seen in FIG. 4A, the magnetic head embodiment 400 includes a first magnetic shield layer 160, a read head sensor element 180 and a second magnetic shield layer 188, as well as the first magnetic pole 196, induction coil structure 200 within filling insulation 212, the shaping layer 220 and probe layer 240 that are similar to the structures depicted in FIG. 2 and described above, whereby they are correspondingly numbered for ease of comprehension.

The optical resonant cavity media heating device 404 of the embodiment 400 is similar in many respects to the media heating device 304 of the embodiment 300 depicted in FIGS. 3A-3F. Particularly, the media heating device 404 is preferably fabricated on the uptrack side of the probe layer 240 between the shaping layer 220 and the ABS 142; it includes an optical resonant cavity 408 and a waveguide 412 for coupling optical energy from a laser source 416 to the cavity 408, and may also include a nano-aperture 420 formed in a metal film 424 that is disposed at the ABS. As is best seen in the enlarged views of FIGS. 4D, 4E and 4F, the resonant cavity 408 is preferably though not necessarily fabricated as a ring shaped cavity 440 that is comprised of one or more thin film structures that are formed in planar thin film layers that are generally parallel to the planes in which the magnetic pole 196 and other thin film magnetic head structures are fabricated, such that the cavity 440 has a principal axis 444 that is parallel to the ABS and a side edge 446 of the cavity is disposed close to the ABS. In a preferred embodiment, the ring shaped cavity 440 is fabricated with a bottom thin film cladding layer 448 of relatively low index of refraction material, such as $SiO_2$, a central ring core 452 that is fabricated as a thin film structure of a relatively high index of refraction material such as silicon, and a top thin film cladding layer 456 that is fabricated of a relatively low index of refraction material such as $SiO_2$ or a nonferrous metal such as gold, silver, aluminum and others. As described hereabove, the ring cavity 440 is sized to function as an optical resonant cavity in a higher order mode or a WGM mode for the wavelength of light that is coupled into it. As previously indicated, a suitable resonant cavity may be any of the known prior art cavities, such as spherical cavities, disk shaped cavities, ring shaped cavities, racetrack shaped cavities, micropillar cavities, photonic crystal cavities and Fabry-Perot cavities, as are known to those skilled in the art.

The waveguide 412 is fabricated in close proximity to the cavity 440 and is spaced appropriately to couple light energy into the cavity. In the embodiment 400, the waveguide 412 is fabricated immediately next to the cavity 440 and directed parallel to the ABS. The waveguide 412 is located in the same magnetic head material thin film layers as the thin film planes of the cavity 440, and may thus be advantageously fabricated in the same fabrication steps as the cavity 440. As with the cavity 440, the waveguide 412 is preferably fabricated with a bottom thin film cladding layer 468 comprised of a relatively low index of refraction material such as $SiO_2$, a central core 472 that is fabricated as a thin film structure and comprised of a relatively high index of refraction material such as silicon, and a top thin film cladding layer 476 that is comprised of a relatively low index of refraction material such as $SiO_2$ or a nonferrous metal such as gold, silver, aluminum and others.

Coupling the light source 416 such as a solid state diode laser to the waveguide 412 can be accomplished by one of several methods, where the source 416 generally is an integrated component of the magnetic slider 117. Generally, the coupling of the light source to the waveguide can be accomplished in a similar manner as that described above with regard to embodiment 300. Therefore, in one coupling method, as is best seen in FIG. 4E, a coupling grating consisting of grating lines 482 is formed on a cladding surface 468 or 476 (not shown) of the waveguide 412. The source 416 is appropriately focused and set at an angle of incidence 484 for best coupling. Alternatively, the light source 416 can be directly coupled into the end of the waveguide 412 away from the cavity. As is depicted in FIG. 4C, the waveguide 412 can be curved away from the ABS, such that the location of the coupling grating 482 can be a several hundred microns or more from the write pole, thus avoiding the crowding of components proximate the write pole tip 248. Other methods of coupling the light source to the cavity can include the use of an optical fiber and the direct focusing of a laser source upon the cavity.

As with embodiment 300, a nano-aperture 420 may be fabricated proximate the cavity 440 at the ABS. Specifically, as is best seen in FIGS. 4D and 4E, the metal film 424, which may be generally rectangular in shape, is fabricated between the outer side edge 446 of the cavity 440 and the ABS 142, and a nano-aperture 420 is fabricated through the thin metal film 424 directly opposite the side edge 446 of the cavity 440. The metal film 424 is preferably a nonferrous metal comprised of a material such as silver, gold, aluminum, rhoditim, platinum, chromium and others, the film having a typical thickness of several tens of nanometers and thus being a fraction of a wavelength thick. The spacing of the side edge 446 of the cavity is preferably a few tens of nanometers from the inner face 490 of the nano-aperture 420, and the outer face 492 of the nano-aperture should be at or a few nanometers from the air bearing surface 142. The nano-aperture 420 thus acts to couple light energy from the resonant cavity 440 outward from the ABS to create a heated spot on the magnetic media that is located immediately uptrack from the location of the magnetic pole tip 248 above the media. In FIG. 4E the nano-aperture 420 is depicted as a C-shaped opening. As discussed above with reference to the magnetic head embodiment 300, the nano-aperture 420 can have a shape resembling the letter C or H or other shapes as are known in the art.

The output energy of the cavity 440, thus extends into the nano-aperture 420 to produce enhanced transmission of energy to create thermal heating at the magnetic medium. Enhanced coupling of energy from the side edge 446 of the cavity 440 to the nano-aperture 420 may be achieved by placing a small opening or pertubation 494 at the cavity side edge 446 location immediately closest to the nano-aperture 420 The size of the pertubation 494 is selected to optimize the coupling of energy to the size of the nano-aperture 420. Since the size of the pertubation 494 can affect the resonant behavior of the cavity 440, the cavity design can be adjusted for best performance of the coupled cavity-nano-aperture operation.

In summary, this invention describes a mechanism for producing heated spots in small localized areas (on the order of 20-30nm across) on a recording medium. Light from a laser source is suitably focused to a spot a few microns in diameter and incident obliquely onto a grating coupler formed on the surface of a strip waveguide. Light propagates down the waveguide until it comes in proximity to the outer wall of a resonant cavity. A suitable resonant cavity may be any of the known prior art cavities, such as spherical cavities, disk shaped cavities, ring shaped cavities, racetrack shaped cavities, micropillar cavities, photonic crystal cavities and Fabry-Perot cavities, as are known to those skilled in the art. At this point the evanescent waves from the waveguide can "tunnel" into the cavity. The cavity is designed to resonate at the wavelength of the incident light so that large intensity levels are built up in the cavity. If a nano-aperture is placed outside the cavity, light will couple from the cavity to the aperture. This coupling from the cavity to the nano-aperture can be enhanced by putting a low index perturbation in the cavity next to the nano-aperture. The resonant cavity and waveguide are readily fabricated at the wafer level utilizing well known thin film fabrication techniques.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What we claim is:

1. A magnetic head, comprising: a write head portion including a magnetic write pole that is disposed in a write pole planar thin film structure that is perpendicular to an air bearing surface of the magnetic head; an optical resonant cavity being comprised of one or more planar thin film structures that are disposed in thin film planes that are parallel to said write pole planar thin film structure and located proximate said write pole, said resonant cavity having a principal axis thereof that is generally parallel to said air bearing surface, wherein the principal axis is further defined as extending through opposite sides of said resonant cavity that are farthest apart; and an optical energy transmission mechanism disposed in a location selected from: in one or more planar thin films of said head that are parallel to said one or more planar thin films that include said resonant cavity, and in said one or more planar thin films of said head that include said resonant cavity.

2. A magnetic head as described in claim 1 further including an optical energy source and an optical energy transmission means to couple optical energy from the source to said resonant cavity.

3. A magnetic head as described in claim 2 wherein said optical energy transmission means includes a waveguide that is disposed proximate said resonant cavity.

4. A magnetic head as described in claim 1 wherein said resonant cavity is one of a spherical cavity, disk shaped cavity, ring shaped cavity, racetrack shaped cavity, micropillar cavity, photonic crystal cavity and Fabry-Perot cavity.

5. A magnetic head as described in claim 1 wherein a nano-aperture is disposed proximate said air bearing surface and said resonant cavity, whereby optical energy from said resonant cavity projects through said nano-aperture generally perpendicularly to said air bearing surface.

6. A magnetic head as described in claim 5 wherein said nano-aperture has one of a square, rectangular, circular, oval, C or H shape.

7. A magnetic head as described in claim 5 wherein said resonant cavity includes a pertubation that is disposed proximate said nano-aperture.

8. A magnetic head as described in claim 1 wherein said resonant cavity is disposed at a location that is uptrack from said write pole.

9. A magnetic head, comprising:
a write head portion including a magnetic write pole that is disposed in a write pole planar thin film structure that is perpendicular to an air bearing surface of the magnetic head; an optical resonant cavity being comprised of one or more planar thin film structures that are disposed in thin film planes that are parallel to said write pole planar thin film structure and located proximate said write pole, said resonant cavity having a principal axis thereof that is generally parallel to said air bearing surface, an optical energy source and an optical energy transmission means to couple optical energy from the source to said resonant cavity, wherein said optical energy transmission means includes a waveguide that is disposed proximate said resonant cavity, wherein said waveguide is disposed in said one or more planar thin films of said head that include said resonant cavity.

10. A magnetic head, comprising:
a write head portion including a magnetic write pole that is disposed in a write pole planar thin film structure that is perpendicular to an air bearing surface of the magnetic head; an optical resonant cavity being comprised of one or more planar thin film structures that are disposed in thin film planes that are parallel to said write pole planar thin film structure and located proximate said write pole, said resonant cavity having a principal axis thereof that is generally parallel to said air bearing surface, an optical energy source and an optical energy transmission means to couple optical energy from the source to said resonant cavity, wherein said optical energy transmission means includes a waveguide that is disposed proximate said resonant cavity, wherein said waveguide is disposed in one or more planar thin films of said head that are parallel to said one or more planar thin films that include said resonant cavity.

11. A hard disk drive, comprising: at least one hard disk being fabricated for rotary motion upon a disk drive; at least one magnetic head adapted to fly over said hard disk for writing data on said hard disk, said magnetic head including: a write head portion including a magnetic write pole that is disposed in a write pole planar thin film structure that is perpendicular to an air bearing surface of the magnetic head; an optical resonant cavity being comprised of one or more planar thin film structures that are disposed in thin film planes that are parallel to said write pole planar thin him structure and located proximate said write pole, said resonant cavity having a principal axis thereof that is generally parallel to said air bearing surface, and an optical energy transmission mechanism disposed in a location selected from: in one or more planar thin films of said head that are parallel to said one or more planar thin films that include said resonant cavity, and in said one or more planar thin films of said head that includes said resonant cavity.

12. A hard disk drive as described in claim 11 further including an optical energy source and an optical energy transmission means to couple optical energy from the source to said resonant cavity.

13. A hard disk drive as described in claim 12 wherein said optical energy transmission means includes a waveguide that is disposed proximate said resonant cavity.

14. A hard disk drive as described in claim 11 wherein said resonant cavity is one of a spherical cavity, disk shaped cavity, ring shaped cavity, racetrack shaped cavity, micropillar cavity, photonic crystal cavity and Fabry-Perot cavity.

15. A hard disk drive as described in claim 11 wherein a nano-aperture is disposed proximate said air bearing surface and said resonant cavity, whereby optical energy from said resonant cavity projects through said nano-aperture, wherein said nano-aperture has one of a square, rectangular, circular, oval, C or H shape.

16. A hard disk drive as described in claim 11 wherein said resonant cavity is disposed at a location that is uptrack from said write pole.

17. A hard disk drive as described in claim 11 wherein a nano-aperture is disposed proximate said air bearing surface and said resonant cavity, whereby optical energy from said resonant cavity projects through said nano-aperture, wherein said resonant cavity includes a pertubation that is disposed proximate said nano-aperture.

18. A hard disk drive, comprising: at least one hard disk being fabricated for rotary motion upon a disk drive; at least one magnetic head adapted to fly over said hard disk for writing data on said hard disk, said magnetic head including: a write head portion including a magnetic write pole that is disposed in a write pole planar thin film structure that is perpendicular to an air bearing surface of the magnetic head; an optical resonant cavity being comprised of one or more planar thin film structures that are disposed in thin film planes that are parallel to said write pole planar thin film structure and located proximate said write pole, said resonant cavity having a principal axis thereof that is generally parallel to said air bearing surface, an optical energy source and an optical energy transmission means to couple optical energy from the source to said resonant cavity, wherein said optical energy transmission means includes a waveguide that is disposed proximate said resonant cavity, wherein said waveguide is disposed in said one or more planar thin films of said head that includes said resonant cavity.

19. A hard disk drive, comprising: at least one hard disk being fabricated for rotary motion upon a disk drive; at least one magnetic head adapted to fly over said hard disk for writing data on said hard disk, said magnetic head including: a write head portion including a magnetic write pole that is disposed in a write pole planar thin film structure that is perpendicular to an air bearing surface of the magnetic head; an optical resonant cavity being comprised of one or more planar thin film structures that are disposed in thin film planes that are parallel to said write pole planar thin film structure and located proximate said write pole, said resonant cavity having a principal axis thereof that is generally parallel to said air bearing surface, an optical energy source and an optical energy transmission means to couple optical energy from the source to said resonant cavity, wherein said optical energy transmission means includes a waveguide that is disposed proximate said resonant cavity, wherein said waveguide is disposed in one or more planar thin films of said head that is parallel to said one or more planar thin films that include said resonant cavity.

* * * * *

UNITED STATES PATENT AND TRADEMARK OFFICE
CERTIFICATE OF CORRECTION

PATENT NO. : 7,729,085 B2  Page 1 of 1
APPLICATION NO. : 11/398144
DATED : June 1, 2010
INVENTOR(S) : Jin et al.

It is certified that error appears in the above-identified patent and that said Letters Patent is hereby corrected as shown below:

In the specification:

col. 11, line 35 replace "rhoditim" with --rhodium--.

In the claims:

col. 13, line 50 replace "him" with --film--.

Signed and Sealed this

Thirty-first Day of August, 2010

David J. Kappos
*Director of the United States Patent and Trademark Office*